United States Patent
Goldenberg

Patent Number: 5,366,072
Date of Patent: Nov. 22, 1994

[54] STORAGE POUCH AND EYEGLASS NECKSTRAP TENSIONING DEVICE

[76] Inventor: Michael P. Goldenberg, 248 Seminole Dr., Chapel Hill, N.C. 27514

[21] Appl. No.: 167,320
[22] Filed: Dec. 14, 1993
[51] Int. Cl.⁵ .............................................. A45C 11/04
[52] U.S. Cl. ...................................... 206/5; 224/205; 224/207; 351/123; 351/156
[58] Field of Search ............... 206/5, 6; 224/240, 235, 224/207, 202, 205, 258, 253, 251, 909; 351/123, 155, 156, 157, 158

[56] References Cited

U.S. PATENT DOCUMENTS

| | | | |
|---|---|---|---|
| 3,850,352 | 11/1974 | Reiner | 224/235 |
| 4,649,973 | 3/1987 | Uchin | 224/207 X |
| 4,796,790 | 1/1989 | Hamilton | 224/253 |
| 4,818,094 | 4/1989 | Lyons | 351/156 X |
| 4,953,695 | 9/1990 | Tallman | 206/5 |
| 5,014,846 | 5/1991 | Walker et al. | 206/5 |
| 5,102,216 | 4/1992 | Mitchell | 206/5 X |
| 5,151,778 | 9/1992 | Conley | 351/156 |
| 5,240,105 | 8/1993 | Tsai | 206/5 |

Primary Examiner—Jacob K. Ackun, Jr.
Attorney, Agent, or Firm—Irving Freedman

[57] ABSTRACT

A protective pouch (26) for storing eyeglasses (24) or small objects such as keys or money that can be rolled up into a compact configuration (44). The pouch is provided with an eyeglass strap (21) with ends (20) capable of releasably attaching to the eyeglass arms (22) so that it is always available for use and cannot be lost. The two ends of the strap pass through holes (25) into the interior cavity (46) of the pouch, pass out the open end (48) of the pouch and are attached to the eyeglass arms. The pouch can slide along the strap to adjust the strap length for tensioning the eyeglasses to a one's head. A cover flap (30) is provided to fasten the pouch in its compact configuration or to close off the pouch opening. When the eyeglasses and strap are stored inside the pouch, the entire package can be worn on one's belt (50) from a loop (28) provided.

10 Claims, 3 Drawing Sheets

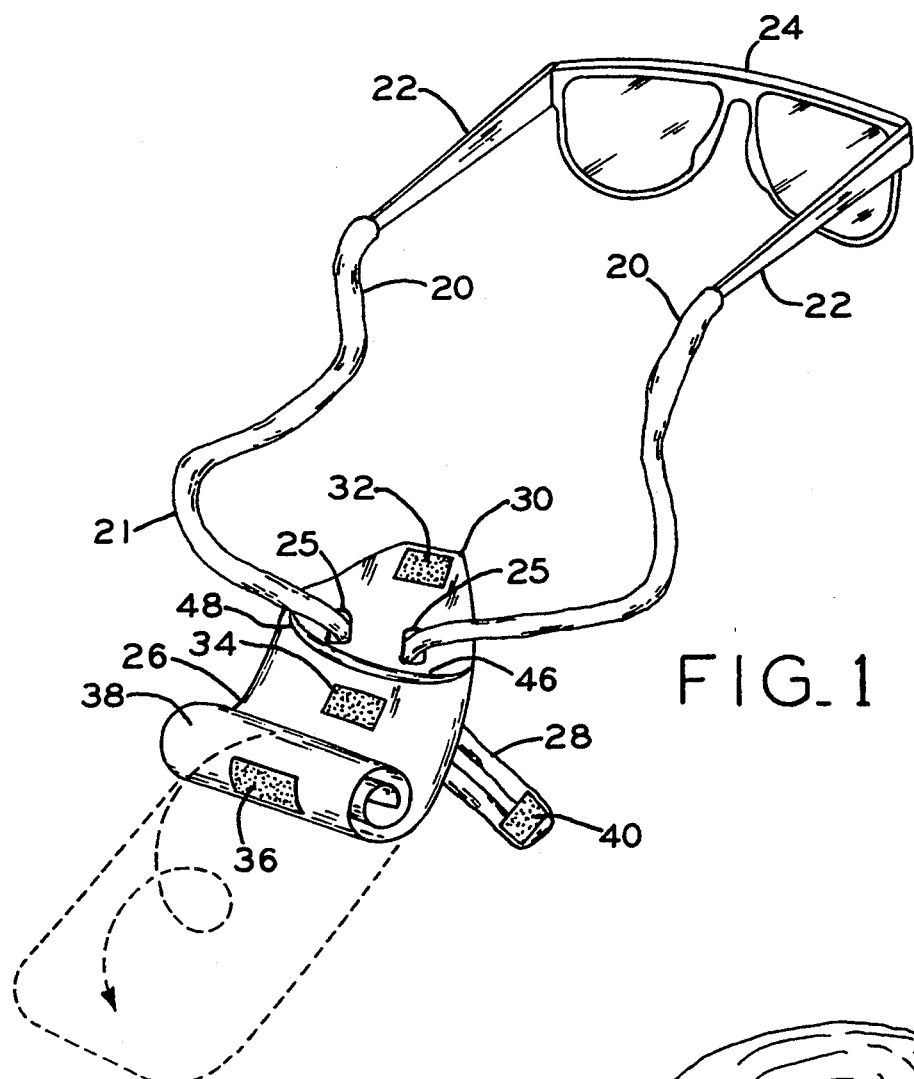
FIG_1
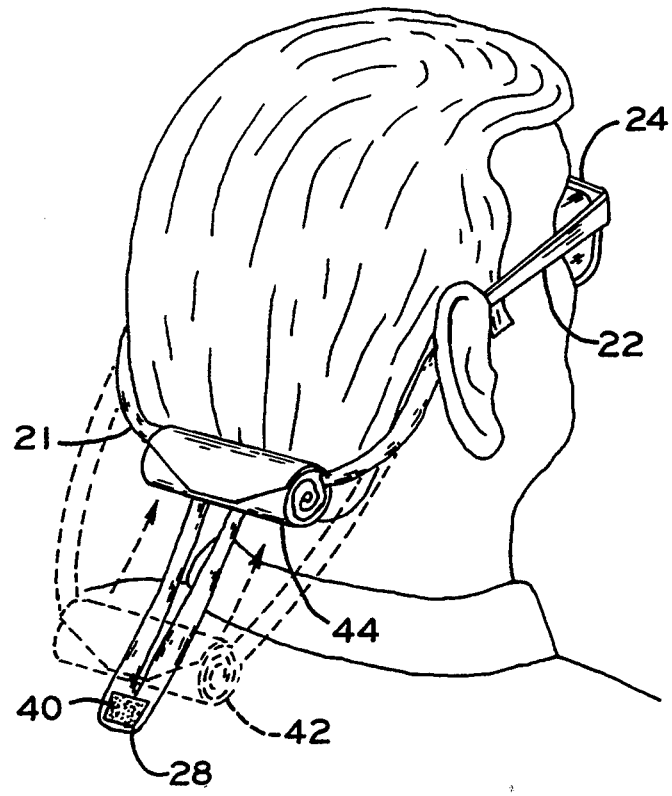
FIG_2

STORAGE POUCH AND EYEGLASS NECKSTRAP TENSIONING DEVICE

BACKGROUND—FIELD OF INVENTION

This Invention relates generally to eyeglass cases and neckstraps. More specifically, this invention relates to a compact storage pouch attached to an eyeglass neckstrap which is capable of deploying and storing the eyeglasses and neckstrap when they are not in use, or for carrying small objects such as keys or money.

BACKGROUND—DESCRIPTION OF PRIOR ART

Eyeglass cases and protective covers are available in a variety of designs, styles and materials. These are used to prevent damage to eyeglasses when they are not in use. Unfortunately, all of the current designs must be carried separately from the eyeglasses when the eyeglasses are being worn. The case is often misplaced, lost or forgotten. Rigid case designs are cumbersome and when worn in pockets detract from one's personal appearance. Often as a result of these inconveniences, eyeglass case use is foregone and the eyeglasses go unprotected when they are not being worn.

Eyeglass neckstraps have recently grown in popularity because they provide several services; They allow the eyeglasses to be worn hanging from the neck or other objects when not in use, and they can tension the eyeglasses and strap to one's head to fasten them securely during physical activities. However, there are many occasions when the eyeglasses are not needed and wearing them hanging from the neckstrap is also a nuisance. This is especially true when eating, or leaning forward while engaged in a task or physical activity. The dangling eyeglasses tend to interfere with these activities and swing about wildly if one's movements are too rapid. When indoors or in low light conditions where sunglasses are not needed, it is might be preferable to store the glasses in a protective device that could be worn from one's clothing or placed in a pocket. At these times the glasses and neckstrap are usually set down or placed somewhere, unprotected. This often results in damaged or lost eyeglasses.

Due to the increased popularity of eyeglass neckstraps, it makes sense to incorporate a compact protective storage pouch with a neckstrap so that eyeglass protection is always available to the user. In addition to offering a convenient means of protecting and storing one's eyeglasses, the pouch could also serve as a storage device for carrying small objects such as keys or money when no other means is available. Furthermore, a method of fastening the storage pouch to articles of clothing could be included to accommodate more portability choices when the eyeglasses and strap are stored within the pouch.

Several types of combination eyeglass strap/lens protectors have been proposed which attempt to prevent eyeglass damage—for example, U.S. Pat. No. 5,014,846 (1991) to Walker et al. This design provides a cavity within an eyeglass neckstrap for storage of a tethered elastic lens cover which can be stretched over the eyeglass lens to prevent lens damage. Provisions in the patent also provide for a storage pouch which hangs from the eyeglass temple pieces if a neckstrap is not desired. Although this design addresses lens scratching problems, it is awkward to use and does not provide a means for protecting the eyeglass arms. When the protective cover is in place over the lenses, the neck strap and eyeglass arms are left hanging loosely from the eyeglasses presenting a disorganized system which is clumsy to stow in a pocket. There is also no method for security attaching the system to a one's clothing for simple portability and the neckstrap has no adjustability for tensioning the eyeglasses to one's head. Finally, there is no method of using the cover as a carrying pouch for small items.

U.S. Pat. No. 4,953,695 (1990) to Tallman defines a tube of elastic material which slides telescopically along the neckstrap, along either eyeglass arm and finally over the eyeglass frame and lens where it remains in its protective position. This design also fails to stow and protect the entire eyeglass and neckstrap system, and makes no provisions for attachment of the system to ones clothing for portability purposes. It also provides no method for tensioning the eyeglasses to ones head or for carrying small items.

What is needed is a device for protecting and carrying eyeglasses when they are not in use, or for carrying other small items such as keys or money, which can be attached to an eyeglass neckstrap and also serve as a neckstrap tensioning device.

OBJECTS AND ADVANTAGES

Several of the objects and advantages of my invention are:

(a) to provide a compact protective storage pouch which is attached to an eyeglass neckstrap and accessible to protect the eyeglasses when they are not in use;

(b) to provide a protective storage pouch which can serve as a carrying device for small items such as keys or money;

(c) to provide a protective storage pouch which is capable of covering and containing a pair of eyeglasses and neckstrap;

(d) to provide a protective storage pouch which can be fastened to articles of clothing while containing a pair of eyeglasses and neckstrap;

(e) to provide a protective storage pouch which can act as a neckstrap tensioning device for securing the eyeglasses to ones head;

(f) to provide a protective storage pouch which can be collapsed and stowed in a compact configuration while attached to an eyeglass neckstrap;

BRIEF DESCRIPTION OF THE DRAWINGS

FIG. 1 is a perspective view of an improved storage pouch and strap attached to a pair of eyeglasses;

FIG. 2 is a perspective view of the storage pouch in its compacted state as used to tension an eyeglass strap, firmly tethering a pair of eyeglasses to a user's head;

Figure 3:
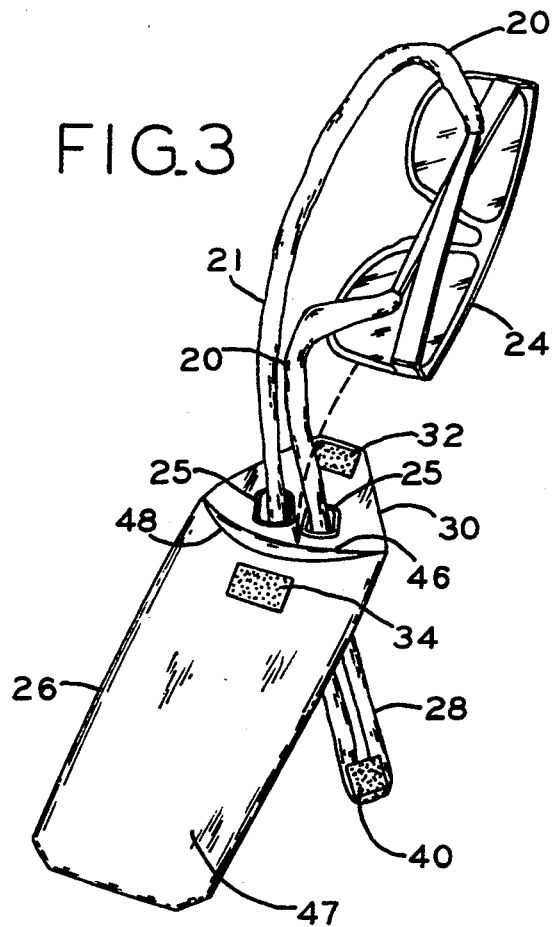
FIG. 3 is a perspective view of the storage pouch in its deployed state, exposing the pouch opening prior to inserting the eyeglasses and strap for storage.

| Reference Numerals In Drawings |
| --- |
| 20 strap ends |
| 21 strap |
| 22 eyeglass arms |
| 24 pair of eyeglasses |
| 25 holes |
| 26 pouch |
| 27 closed end of pouch |
| 28 looped end of strap |
| 30 foldable cover flap |
| 31 flap fold line |
| 32 fastener on cover flap |
| 34 fastener on front surface |
| 36 fastener on rear surface |
| 38 rear surface |
| 40 fastener on strap |
| 42 extended position |
| 44 compact configuration |
| 46 tubular interior cavity |
| 47 front surface of pouch |
| 48 open end of pouch |
| 50 belt |
| 52 belt loop |

DESCRIPTION OF A PREFERRED EMBODIMENT

As shown in the drawing for purposes of illustration, the invention resides in an improved protective storage pouch for eyeglasses. The pouch is slidably attached to an eyeglass neckstrap which is attached to the arms of a pair of eyeglasses. The combination of a storage pouch with an eyeglass neckstrap ensures the availability of a method for protecting the eyeglasses at any time that the eyeglasses are not in use, or for carrying small objects such as keys or money. Use of a protective storage pouch is often forgone because of the inconvenience of carrying the pouch separately from the eyeglasses. To use the invention as an eyeglass storage pouch, one simply unfastens the cover flap which permits the pouch to unravel, exposing the opening to the pouch cavity. The eyeglasses and attached strap are then passed through the pouch opening until they are completely within the pouch cavity, and the cover flap folded over the opening and fastened shut to prevent the eyeglasses from escaping. Once enclosed within the pouch, the whole package can be worn from a belt by looping the exposed end of the neckstrap around the belt and fastening it to the fastener located on the pouch body.

The present invention also has the added benefit of serving as a neckstrap tensioning device which makes the neckstrap more useful to the wearer. When the storage pouch is stowed in its compacted state, it can be positioned at any point along the neckstrap to adjust the size of the neckstrap loop to tension the eyeglasses to one's head while remaining inconspicuous. This feature is particularly useful when one is engaged in physical activities or sports where a pair of eyeglasses could easily be dislodged and fall to the ground and break. If one chooses to wear the eyeglasses hanging loosely from the neck when not needed, the storage pouch can be adjusted to the end of the neckstrap to afford the greatest neckstrap loop size.

Finally, the storage pouch has the ability to serve as a method for a carrying small valuables when alternate methods for carrying these items are not available. This situation typically arises when one is at the beach wearing a bathing suit or jogging in shorts without pockets. It is often desirable to carry automobile or house keys, money or other small objects which necessitates the use of a carrying bag or waist belt pack if pockets are not available. To use the storage pouch to carry small objects, the pouch is deployed by unlatching the cover flap permitting it to unravel, revealing the opening to the pouch cavity. Items are placed into the pouch cavity and the cover flap is fastened to secure them inside. The carrying pouch, neckstrap and eyeglasses are then worn about one's neck and head in either the loose or tightened configuration described previously.

A typical embodiment of the improved storage pouch of the present invention is shown in FIG. 1 (perspective view). A strap 21 is provided having first and second ends 20 capable of releasably attaching to arms 22 of a pair of eyeglasses 24. Strap 21 is preferably constructed of an elastomeric fabric of tubular design at least at ends 20 to fit snugly over the ends of arms 22. Holes or apertures in pouch 26 provide frictional force or restraining force against the movement of ends 20 of strap 21 therethrough such that an applied force is required to change the position of pouch 26 along the ends of the strap enabling selective positioning of the pouch on the strap. Although arms 22 are secured within ends 20 in a preferred embodiment, other means of releasably attaching ends 20 to arms 22 are considered within the scope of this invention. This includes but is not limited to straps with looped ends and expandable rings for encircling arm 22.

A pouch 26 is slidably attached to strap 21 where ends 20 pass through holes 25 in pouch 26. The midsection of strap 21 forms a looped end 28 which limits the sliding travel of strap 21 relative to pouch 26. Pouch 26 is preferably constructed from a soft, stretchable knit material sewn in a manner which creates a tubular interior cavity 46 with a closed end 27, and an open end 48 for receiving eyeglasses 24. A foldable cover flap 30 which hinges about fold line 31 is provided for closure of end 48. Fastener 32 on flap 30 and mating fastener 34 located on front surface 47 of pouch 26 are provided for securing flap 30 in a closed position when eyeglasses 24 are deposited within cavity 46 (see FIG. 4). Fastener 32 is also matable to fastener 36 located on the rear surface 38 of pouch 26 for use in securing pouch 26 in its rolled-up, compact configuration 44 and fully extended position 42 depicted in FIG. 2. Looped end 28 of strap 21 has a fastener 40 attached which is matable to fastener 36 for use in forming a closed loop in strap 21 for passing around and securing pouch 26 and enclosed eyeglasses 24 to objects such as a belt 50 or a belt loop 52 (see FIG. 5). Although "VELCRO" fasteners are used in the preferred design, alternative fastening devices such as snaps, buttons, hooks and loops etc. are usable with the present invention. Likewise, there are many ways of attaching a pouch to other objects such as clothing and are considered within the scope of this invention.

When pouch 26 is arranged into configuration 44 (see FIG. 2) it is still capable of sliding along strap 21 for adjustably tensioning eyeglasses 24 to one's head. In the preferred embodiment, the method for compacting pouch 26 is a rolling-up procedure which begins at closed end 27 of pouch 26 and stops at flap 30 (see FIGS. 1 and 2), although configuration 44 could have been achieved through numerous methods such as a folding or bundling procedure. To prevent pouch 26 from unraveling, flap 30 is secured using fastener 32 and fastener 36

OPERATION OF THE PREFERRED EMBODIMENT

FIGS. 1-4 show the various steps in using the invention to protect eyeglasses 24. In step 1 (FIG. 2) pouch 26 is shown in its configuration 44 and being used to adjust the length of strap 21 to tension eyeglasses 24 to a one's head. In this mode, the invention protects eyeglasses 24 from falling off of the one's head accidentally while engaged in a vigorous activity. Also shown in FIG. 2 (in dashed lines) is configuration 44 at its most extended position 42. When at position 42, strap 21, pouch 26 and eyeglasses 24 form a large loop capable of easily passing over one's head, providing enough slack in strap 21 for wearing eyeglasses 24 hanging loosely from a one's neck when not in use.

In step 2, (FIG. 1) flap 30 is unfastened which enables pouch 26 to unroll, exposing the opening to cavity 46. At this stage, pouch 26 is ready for use as a protective storage device for eyeglasses 24 and strap 21 or as a carrying device for objects small enough to fit within cavity 46.

FIG. 3 shows step 3 where eyeglasses 24 and strap 21 are passed into pouch cavity 46. Note that this view shows the general location of holes 25 with respect to flap 30. In the preferred embodiment, holes 25 are located on surface 38 of pouch 26 approximately within 2 centimeters of line 31 and between closed end 29 and line 31, although many locations and configurations could be used to achieve a similar result.

Figure 4:
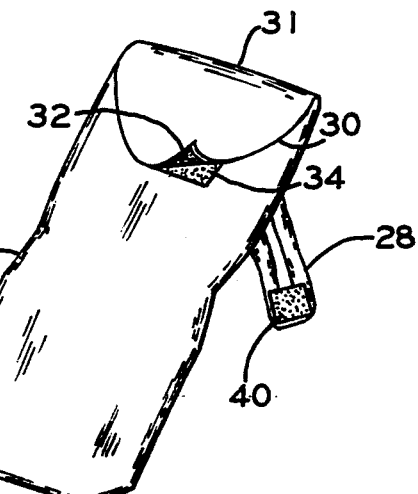
FIG. 4 is a perspective view of the storage pouch encompassing the eyeglasses and strap and showing a cover flap and fastener for securing the eyeglasses and strap within.

FIG. 4 shows step 4 where eyeglasses 24 and strap 21 are completely enclosed within pouch 26 with the exception of end 28 of strap 21. End 28 remains accessible for use in attaching pouch 26 to a one's belt 50, loop 52, or other convenient object. Flap 30 and fastener 32 are then mated to fastener 34 to prevent eyeglasses 24 from accidentally escaping from pouch 26.

Figure 5:
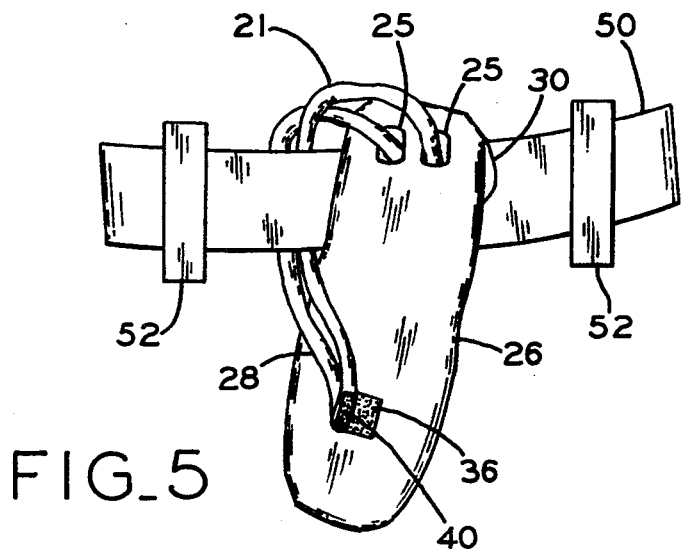
FIG. 5 is a perspective view of the posterior side of the storage pouch as worn on a belt showing the strap extremity and fastener being used to attach thereto.

FIG. 5 shows pouch 26 as worn from belt 50. End 28 of strap 21 is passed around belt 50 and fastener 40 is attached to fastener 36. This technique could also be used to attach pouch 26 to numerous objects such as loops 52, handbag straps, bicycle handlebars, automobile rear-view mirrors, etc. In the preferred embodiment, end 28 is used as an attachment device for the entire invention 23, although alternate attachment devices such as loops, hooks, clips or clamping devices could have been added to the invention to achieve a similar result and are considered within the scope of the present invention.

Figure 6:
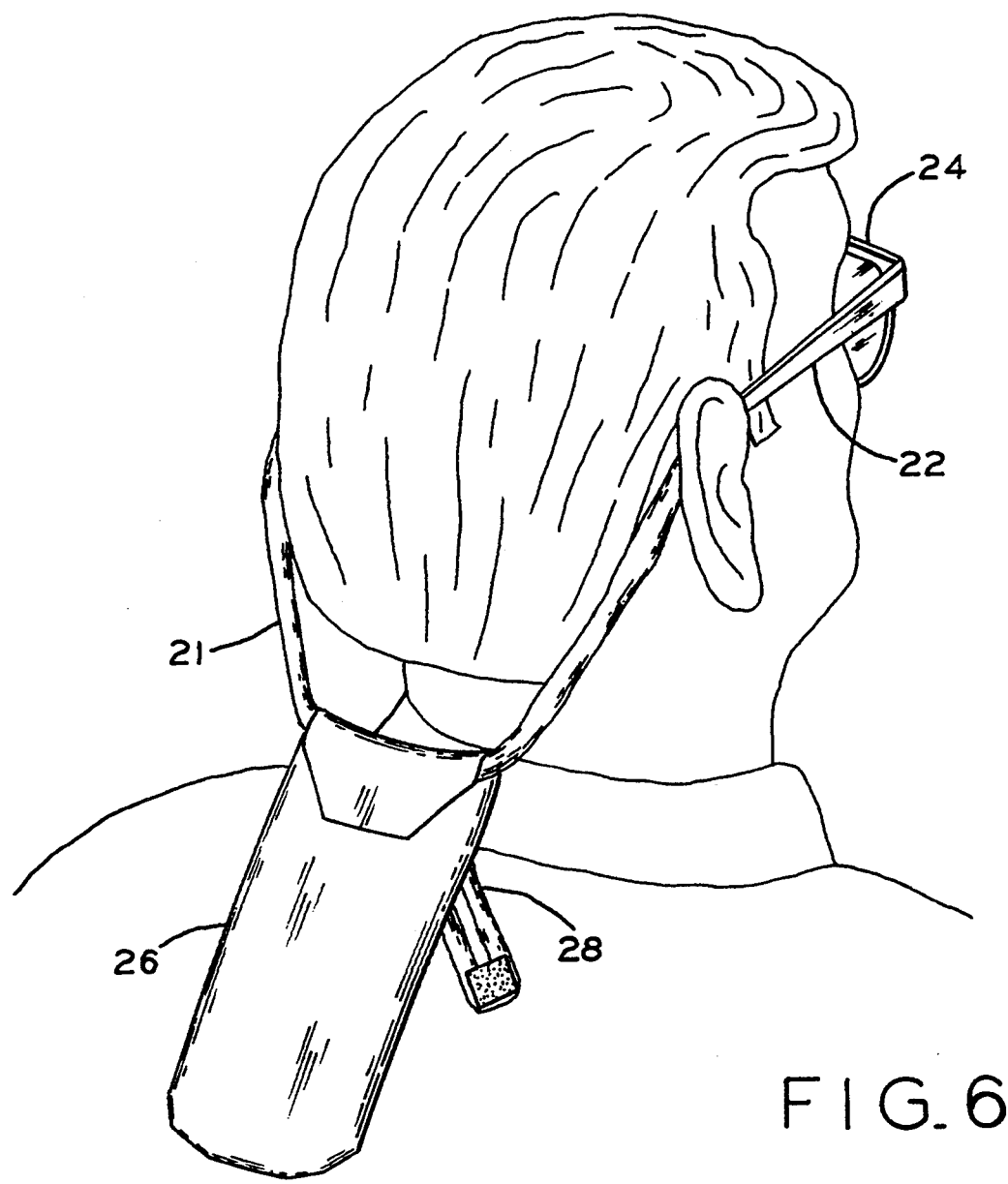
FIG. 6 is a perspective view of the storage pouch in its extended state about a user's head and serving as a carrying pouch for small items.

FIG. 6 shows pouch 26 worn loosely about a one's neck in its deployed state. In this configuration, pouch 26 can easily serve as a carrying device for small objects such as keys, money, jewelry, etc. This use of the invention often arises when one is wearing a bathing suit or clothing without pockets and has a need to carry such items about.

SUMMARY, RAMIFICATIONS, AND SCOPE OF INVENTION

Accordingly, the reader will see that the protective storage pouch of this invention can be used to tension a pair of eyeglass and strap to one's head or to store and protect a pair of eyeglasses and strap when they are not in use. In addition, the storage pouch can be used for carrying small objects such as keys or money while the invention is worn about one's head or neck. Furthermore, the protective storage pouch has the additional advantages in that

- it ensures that eyeglass protection is always conveniently available to the user and can not be misplaced or forgotten;
- it can be worn from one's belt or clothing or attached to a variety of objects while storing and protecting a pair of eyeglasses;
- it can be configured into a compact state which results in an unobtrusive package which does not detract from one's appearance.

Although the description above contains many specificities, these should not be construed as limiting the scope of the invention but merely providing illustrations of some of the presently preferred embodiments of this invention. For example, the pouch can me made from other materials such as leather, suede, neoprene, cotton fabric, etc.; it can also have other shapes such as rectangular, triangular, circular, trapezoidal, etc.; the pouch can have other attachment devices for connecting it to one's clothing such as snaps, hooks, loops, etc.; the eyeglass strap could be one of many styles currently available in the retail marketplace, etc.; the attachment method used between the strap and pouch could be accomplished with one hole or with loops of fabric, etc.

Thus the scope of the invention should be determined by the appended claims and their legal equivalents, rather then by the examples given.

I claim:

1. An improved protective pouch assembly for storing objects, including eyeglasses having lenses, a frame and a pair of foldable arms and for positioning the frame on the head of a user comprising:

a flexible strap having opposite ends, each of said opposite ends having attaching means to selectively attach said protective pouch to the ends of said foldable arms of said eyeglasses;

a hollow, flexible collapsible pouch having a closed end and an open end enabling compacting of said pouch from an extended profile to a compact profile;

connecting means for linking said pouch to said strap;

said connecting means comprising at least one aperture in one end of said pouch through which at least one of said portions of flexible strap passes;

said compact profile being adjacent said one end of said pouch;

said pouch in said extended profile enabling insertion of and providing protection to said eyeglasses when said pouch is in said extended profile; and said at least one aperture providing a frictional force against movement of said flexible strap to enable selective positioning of said pouch along said flexible strap relative to the head of said user including a tensioning position securing said pouch adjacent the head of said user to retain said eyeglasses;

whereby said eyeglasses may be selectively secured to and retained on the head of said user in said compact profile.

2. The improved protective pouch of claim 1 wherein said connecting means is comprised of two apertures located on said body to receive said strap and one portion of said strap passes through each aperture to the exterior of said pouch.

3. The improved eyeglass pouch of claim 2 wherein the portion of said body remote from said apertures is collapsible to said compact profile and a first fastener is provided on the outside of said pouch adjacent said one end of said pouch and a foldable flap including a second fastener on the inside of said pouch extends from said one end of said pouch with said second fastener positioned to contact said first fastener to secure said pouch in said compact profile with the compacted pouch secured between said first fastener and said second fastener.

4. The improved eyeglass pouch of claim 3 further including a foldable flap and cooperating fasteners for said open end for securely retaining said objects within said body.

5. The improved protective pouch assembly of claim 3 further including pouch attachment means for selectively connecting a portion of said strap on the exterior of said pouch to a clothing article whereby said pouch can be worn on one's person to carry and protect said eyeglasses and the remainder of said strap when not in use.

6. The improved protective eyeglass pouch of claim 5, wherein said clothing article is a belt and said pouch attachment means comprises a third fastener on a loop formed in the central region of said exterior portion of said flexible strap and a fourth fastener on the exterior of said pouch enabling said loop to be selectively passed around said belt, with the cooperation of said third and fourth fasteners enabling selective attachment of said protective eyeglass pouch to said belt.

7. The improved protective pouch assembly of claim 1 wherein said strap is a unitary member folded proximate its center to form a loop and said pouch is slidable and positionable along said strap enabling telescopic movement of said pouch to said compact profile at any selected point along said strap including a point wherein said pouch contacts the head of said person to tension said strap and said eyeglasses to one's head for retention of said eyeglasses.

8. The improved protective pouch assembly of claim 7 wherein said two apertures are provided in said pouch body at the open end thereof and one of said opposite ends is passed through each of said apertures from the exterior to the interior of said pouch body and then through said open end for attachment to one each of said foldable arm ends.

9. The improved protective pouch assembly of claim 8 further including a foldable cover flap and closure means at said open end containing cooperating fasteners on said pouch body and said cover flap for securely retaining said eyeglasses and said strap within said body.

10. The improved protective pouch assembly of claim 6 wherein said third and fourth fasteners for said pouch attachment means and said first and second fasteners include VELCRO material.

* * * * *